(12) United States Patent
Kato

(10) Patent No.: US 10,996,056 B2
(45) Date of Patent: May 4, 2021

(54) VIBRATING MICRO-MECHANICAL SENSOR OF ANGULAR VELOCITY

(71) Applicant: MURATA MANUFACTURING CO., LTD., Nagaokakyo (JP)

(72) Inventor: Yoshitaka Kato, Helsinki (FI)

(73) Assignee: MURATA MANUFACTURING CO., LTD., Kyoto (JP)

(*) Notice: Subject to any disclaimer, the term of this patent is extended or adjusted under 35 U.S.C. 154(b) by 173 days.

(21) Appl. No.: 15/152,931

(22) Filed: May 12, 2016

(65) Prior Publication Data

US 2016/0334215 A1 Nov. 17, 2016

(30) Foreign Application Priority Data

May 15, 2015 (FI) ..................................... 20155354

(51) Int. Cl.
G01C 19/5705 (2012.01)
G01C 19/5719 (2012.01)
(Continued)

(52) U.S. Cl.
CPC ..... G01C 19/5719 (2013.01); G01C 19/5712 (2013.01); G01C 19/5747 (2013.01); G01C 19/5762 (2013.01)

(58) Field of Classification Search
CPC ............ G01C 19/5719; G01C 19/5712; G01C 19/5747; G01C 19/5705; G01C 19/5733;
(Continued)

(56) References Cited

U.S. PATENT DOCUMENTS

2006/0272411 A1 12/2006 Acar et al.
2007/0012653 A1 1/2007 Nasiri et al.
(Continued)

FOREIGN PATENT DOCUMENTS

CN 1802550 A 7/2006
JP 2011-252907 A 12/2011
(Continued)

OTHER PUBLICATIONS

Taiwanese Search Report issued in corresponding Taiwanese Patent Application No. 105114109 dated Jan. 6, 2017.
(Continued)

*Primary Examiner* — David M. Gray
*Assistant Examiner* — Ruben C Parco, Jr.
(74) *Attorney, Agent, or Firm* — Squire Patton Boggs (US) LLP

(57) ABSTRACT

A sensor structure and a method for operating a vibrating sensor of angular velocity comprising a rotor mass and two linearly moving masses is disclosed. The sensor structure and method comprises a rotor mass, two linearly moving masses, and two T-shaped levers each coupled with the two linearly moving masses and to the rotor mass. The T-shaped levers enable the rotor mass and the two linearly moving masses to be excited into an anti-phase primary mode, where the direction of angular momentum of the rotor mass is opposite to the direction of angular momenta of the linearly moving masses. Angular momenta of the rotor mass and the linearly moving masses cancel each other to a high extent, so that the total sum of angular momentum of the structure is very small. Nominal frequency of the anti-phase primary mode is distinctively low as compared to nominal frequencies of other possible primary modes, such as a parallel phase primary mode.

7 Claims, 6 Drawing Sheets

(51) Int. Cl.
*G01C 19/5712* (2012.01)
*G01C 19/5762* (2012.01)
*G01C 19/5747* (2012.01)

(58) Field of Classification Search
CPC .............. G01C 19/574; G01C 19/5755; G01C 19/5762
See application file for complete search history.

(56) References Cited

U.S. PATENT DOCUMENTS

| | | |
|---|---|---|
| 2010/0037690 A1 | 2/2010 | Guenthner et al. |
| 2010/0071467 A1 | 3/2010 | Nasiri et al. |
| 2010/0186507 A1 | 7/2010 | Guenthner et al. |
| 2011/0023600 A1 | 2/2011 | Wrede et al. |
| 2011/0296913 A1* | 12/2011 | Ohms ................ G01C 19/5755 73/504.12 |
| 2012/0216612 A1 | 8/2012 | Seeger et al. |
| 2013/0068018 A1 | 3/2013 | Seeger et al. |
| 2013/0233048 A1 | 9/2013 | Anac et al. |
| 2016/0069682 A1* | 3/2016 | Balslink ............. G01C 19/5747 73/504.12 |
| 2016/0084654 A1* | 3/2016 | Senkal ................ G01C 19/5747 73/502 |

FOREIGN PATENT DOCUMENTS

| | | |
|---|---|---|
| NO | 2004081495 A2 | 9/2004 |
| TW | 201102616 A | 1/2011 |
| WO | WO 2009/127782 A1 | 10/2009 |
| WO | 2014/184225 A1 | 11/2014 |

OTHER PUBLICATIONS

International Search Report application No. PCT/1132016/052713 dated Aug. 30, 2016.
Finnish Search Report dated Nov. 13, 2015 corresponding to Finnish Patent Application No. 20155354.

* cited by examiner

VIBRATING MICRO-MECHANICAL SENSOR OF ANGULAR VELOCITY

BACKGROUND

Field

The present invention relates to measuring devices used in measuring angular velocity and especially to vibrating sensors of angular velocity as defined in the preamble of independent claim 1. The present invention further relates to a micromechanical gyroscope element and more particularly to a gyroscope element capable of measuring angular velocity with two or three degrees of freedom. The present invention also relates to a method for operating a vibrating sensor of angular velocity.

Description of Related Art

International patent application publication WO2009/127782 presents a micro-electro-mechanical MEMS sensor used for measuring angular velocity in relation to two or three axes. It has three masses: a rotor mass and two linear seismic masses. The linear seismic masses are coupled to the rotor mass with flexible springs. The linear seismic masses are excited to a vibration, and the rotor mass follows their direction so that angular momentum derived from the rotor mass and from the two linear masses always have mutually same direction, altering between clockwise and counter clockwise.

The terms linearly moving mass, linear moving mass or simply linear mass refers to the intended linear primary movement of the mass rather than form or shape of the mass. A linearly moving mass is intended to be excited to a linear primary oscillation motion along an axis, not into a rotating primary motion about a rotation axis.

Measuring angular velocity or angular rate (absolute value of an angular velocity vector) with a vibrating sensor of angular velocity is known to be a simple and reliable concept. In a vibrating sensor of angular velocity, a primary motion of vibrating mass/es is produced and maintained in the sensor. The motion to be measured is then detected as deviation from the primary motion.

In a MEMS gyroscope, mechanical oscillation is used as the primary motion, referred also to as the primary motion or the primary mode. When an oscillating gyroscope is subjected to an angular motion orthogonal to the direction of the primary motion, an undulating Coriolis force results. This creates a secondary oscillation, also referred to as the sense mode, orthogonal to the primary motion and/or to the axis of the angular motion, and at the frequency of the primary oscillation. The amplitude of this coupled oscillation can be used as the measure of the angular rate, i.e. the absolute value of angular velocity.

In a gyroscope device, combination of multiple moving masses may cause total angular momentum in addition to total linear momentum, both of which may cause some problems in the gyroscope device. For example, non-zero total momentum may cause instability of rate offset, rate signal noise, susceptibility to and/or interference with external mechanical shock and vibration in addition to problems caused during start up time, which will be described in more detail later.

SUMMARY

An object of the present invention is to provide a method and apparatus so as to overcome the prior art disadvantages and specifically to alleviate problems caused by non-zero total angular momentum.

Embodiments of the present invention have the advantage that the sensor element according to the claims the enables reliable measurement of angular velocity with good performance. Presented sensor element structure has an anti-phase primary mode which has low nominal frequency and very low total angular momentum. Low nominal frequency facilitates mechanical robustness of the entire sensor device. Low total angular momentum reduces detectable vibration of the sensor element. Thus, no or very little vibrational energy leaks outside of the sensor element, which improves stability of sensor device Q-value.

According to a first aspect, a structure for a vibrating sensor of angular velocity is provided, comprising at least a rotor mass and two linearly moving masses. The structure comprises two T-shaped levers each coupled to the two linearly moving masses and to the rotor mass by flexible springs. The T-shape levers enable the rotor mass and the two linearly moving masses to be excited into an anti-phase primary mode, wherein a direction of the angular momentum of the rotor mass with respect to a geometrical center of the structure is opposite to a direction of angular momenta of the linearly moving masses.

According to a second aspect, the two T-shaped levers are located symmetrically at first opposite sides of the rotor mass.

According to a third aspect, said linearly moving masses are located symmetrically at second opposite sides of the rotor mass.

According to a fourth aspect, the sensor further comprises exciting means for exciting the two linearly moving masses into a linear primary oscillation motion within the plane of the device, and the two T-shaped levers are configured to convey the linear primary oscillation motion of the two linearly moving masses into a rotating primary motion of the rotor mass, the rotating primary motion occurring within the plane of the device.

According to a fifth aspect, the linear primary oscillation motion is configured to occur along two parallel first axes respectively, wherein the two linearly moving masses are configured to move in opposite phases, and the two parallel first axes are separated by a non-zero distance, and the rotating primary motion of the rotor mass is configured to occur about a second axis perpendicular to the plane of the device.

According to a sixth aspect, ends of the T-shape levers coupled to the rotor mass and to the linearly moving masses form an isosceles triangle, and each T-shape lever comprises a second lever attached to a first lever in approximately middle of the length of the first lever, and/or the second lever and the first lever are attached in an angle of 90 degrees.

According to a seventh aspect, the T-shape levers further enable the rotor mass and the two linearly moving masses to be excited into a parallel phase primary mode where the direction of angular momentum of the rotor mass is the same as the direction of angular momenta of the linearly moving masses.

According to an eighth aspect, a nominal frequency of the anti-phase primary mode is lower than a nominal frequency of the parallel phase primary mode.

According to a ninth aspect, the anti-phase primary mode has a total angular momentum that is less than 5% of a sum of absolute values of angular momenta of the rotor mass and the two linearly moving masses.

According to a tenth aspect, the structure further comprises two supporting frames, wherein each of the two supporting frames is coupled non-flexibly to a first suspending structure and each of the two supporting frames is coupled to at least two second suspending structures with flexible springs. Each of the two supporting levers are coupled to one of the linearly moving masses with at least two flexible springs.

According to a first method aspect for operating a vibrating sensor of angular velocity comprising at least a rotor mass and two linearly moving masses, the method includes setting the rotor mass and the two linearly moving masses into an anti-phase primary mode, wherein a direction of the angular momentum of the rotor mass with respect to a geometrical center of the structure is opposite to a direction of angular momenta of the linearly moving masses.

According to a second method aspect, the method comprises setting the rotor mass and the two linearly moving masses into the anti-phase primary mode using two T-shaped levers, wherein each T-shape lever is coupled to the two linearly moving masses and to the rotor mass with flexible springs.

According to a third method aspect, the setting the rotor mass and the two linearly moving masses into the anti-phase primary mode comprises exciting the two linearly moving masses into a linear primary oscillation motion within the plane of the device, and using the two T-shaped levers to convey the linear primary oscillation motion of the two linearly moving masses into a rotating primary motion of the rotor mass, the rotating primary motion occurring within the plane of the device.

According to a fourth method aspect, the linear primary oscillation motion occurs along two parallel first axes, wherein the two linearly moving masses oscillate in opposite phases, and wherein the two parallel first axes are a non-zero distance away from each other, and the rotating primary motion occurs about a second axis perpendicular to a plane of the device.

According to a fifth method aspect, the two T-shape levers are located symmetrically at first opposite sides of the rotor mass.

According to a sixth method aspect, the two linearly moving masses are located symmetrically at second opposite sides of the rotor mass.

According to a seventh method aspect, the anti-phase primary mode has a total angular momentum that is less than 5% of a sum of absolute values of angular momenta of the rotor mass and the two linearly moving masses.

According to a ninth method aspect, said T-shape levers further enable the rotor mass and the two linearly moving masses to be excited into a parallel phase primary mode where a direction of angular momentum of the rotor mass is the same as a direction of angular momenta of the linearly moving masses.

According to a tenth method aspect, a nominal frequency of the anti-phase primary mode is lower than a nominal frequency of the parallel phase primary mode.

According to an eleventh method aspect, the two linearly moving masses are further supported by two supporting frames, the supporting frames reducing movement of the two linearly moving masses out of the plane of the device during the linear primary oscillation motion.

BRIEF DESCRIPTION OF THE DRAWINGS

In the following the invention will be described in greater detail, in connection with preferred embodiments, with reference to the attached drawings, in which.

DETAILED DESCRIPTION

With reference to "plane of the device", "plane of the structure", "plane of the sensor", "plane of the masses" or "plane of the rotor mass", we mean a plane formed by inertial masses of the sensor device in their initial position when not excited to any movement. In the coordinates in the figures of this document, this plane corresponds to the xy-plane. Inertial masses of a physical device have a non-zero thickness in direction of the z-axis. The plane of these masses should be understood to comprise a flat plane comprised within the thickness of the respective referred structural elements.

The term "linearly moving mass" refers to a seismic mass intended to have a linear primary oscillation motion, i.e. a longitudinal oscillation along a given axis, to differentiate a seismic mass intended to have such linear primary oscillation motion from a seismic mass intended to have a rotating primary motion. The linearly moving mass may have various secondary, sensing motion modes according to design and intended use of the sensor device.

The term "rotor mass" refers to a seismic mass that is intended to have a rotating primary motion, and is capable of and intended to rotate about one, two or three axes of freedom, wherein rotation motion about one specific axis is part of the primary mode and rotation motion about one or two other axes may be used for secondary, sensing motion. While "linear primary oscillation motion" refers to the motion of the linearly moving masses and the "rotating primary motion" refers to the motion of the rotor mass, "primary mode" stands for a combination of the movements of all inertial parts of a sensor element when excited to a primary motion.

In an inertial MEMS device, spring structures are made up from beams, which normally have a uniform cross-section. While MEMS technology is planar in nature, the dimensions of the beams are limited, especially in the z-axis dimension or thickness. Thus, the moveable parts of a MEMS device may be considered to form a substantially planar structure in the xy-plane. Length and width of the beam can be varied, as well as the shape. In this description, term "spring" is used for any kind of straight, folded or bent beam structure intended to work as a flexible spring. For example, a spring may be a structure where a narrow beam has been folded one or more times, allowing a flexible movement in at least one direction. A straight beam may work as a spring, when its stiffness is low, allowing the beam to twist or bend, or to move torsionally. Term "lever" refers to structures which are intended to be stiff, i.e. not flexible like springs. These may be formed as beams or as a combination of more than one beams, of they may comprise more complex structures.

Figure 1A:
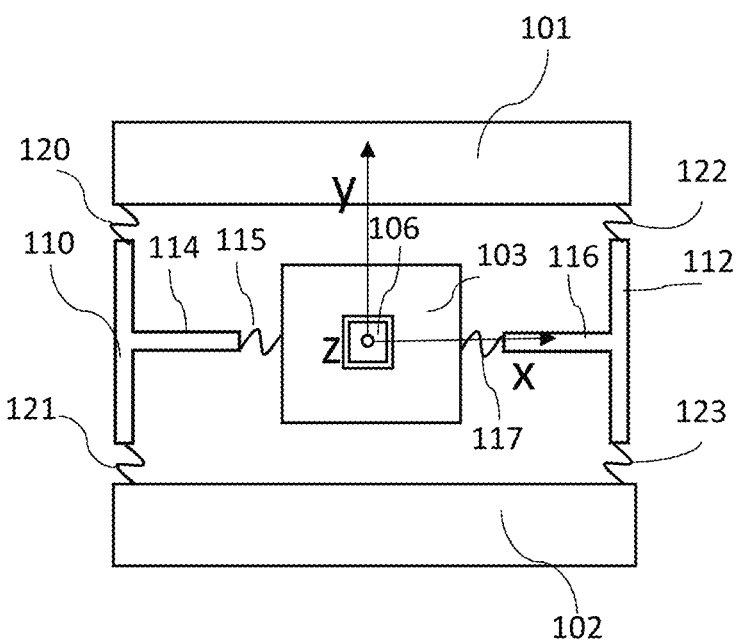
FIG. 1a is a schematic presentation the main structural parts of the sensor element.
Figure 1B:
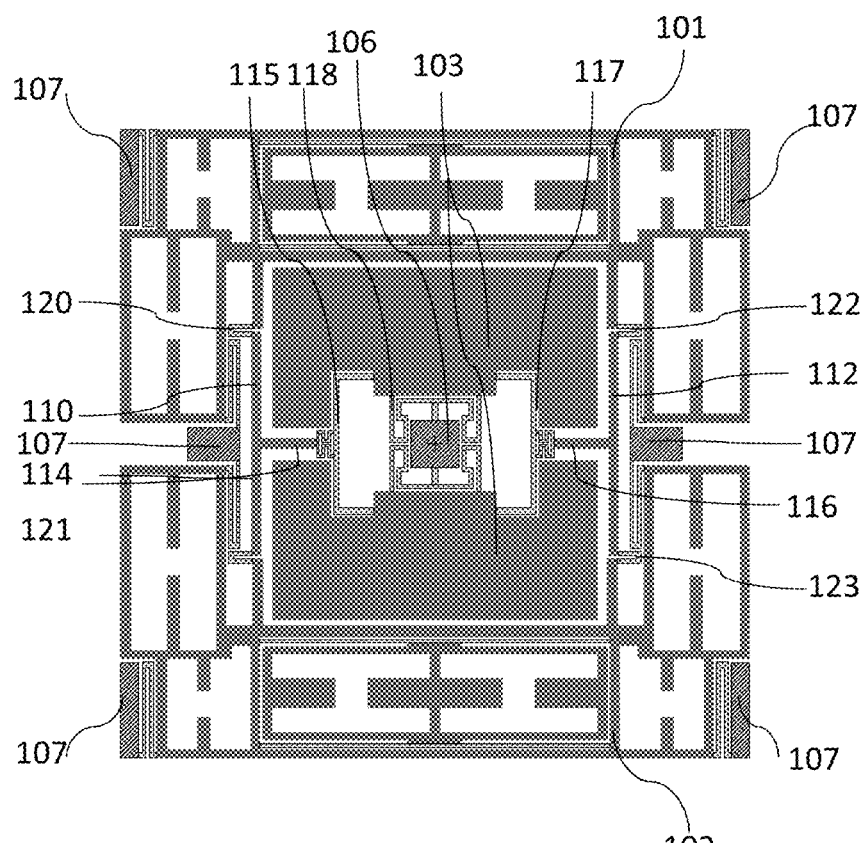
FIG. 1b presents an embodiment of the sensor element

FIG. 1a schematically illustrates the main structural parts of a sensor element. FIG. 1b shows an exemplary embodiment of the same element, with some more implementation details. The figures are described here in parallel, and the common structural elements have same references when visible. While this drawing aims in explaining the nature and the functionality of the inertial, moving elements within the sensor element, the supporting body of the sensor element is not shown in these figures. The supporting body of the sensor may include a handle wafer underneath a device layer that is suspended above the handle wafer. The device layer includes all inertial and movable parts of the sensor, including the structural parts described here.

The sensor element according to FIGS. 1a and 1b has at least two linearly moving masses (101, 102), and a rotor mass (103). The linearly moving masses (101, 102) are excited to a primary motion in-plane, and they may be used to sense angular velocity about z-axis. More particularly, the linearly moving masses are excited into a linear primary oscillation motion occurring in the plane of the masses in direction of the x-axis. With the direction of x-axis it's meant that the motion is intended to occur primarily in the direction of the x-axis, although some deviation of this direction may occur i.e. due to non-idealities of a physical device. Deviation from the exact intended direction within normal working tolerances is allowed without departing from the scope. When angular velocity about z-axis affects the oscillating linearly moving masses (101, 102), Coriolis force is caused in y-axis direction, and the linearly moving masses (101, 102) may start a detection motion in y-axis direction. The rotor mass (103) is excited into a rotating primary motion about a z-axis perpendicular to the plane of the masses, and it may be used to detect in-plain angular velocity. The structure of the linearly moving masses may vary. They may comprise just a single moving mass each, or they may comprise of at least two moving masses each. For example, each linearly moving mass may comprise an inner moving mass and an outer moving mass, also called as a frame. In a yet further alternative, each linearly moving mass may comprise more than one moving masses inside the frame. The purpose of the different moving masses is to give the mass the required degrees of freedom for the primary mode and the secondary, sensing motion (sense mode). Details of structures of linearly moving masses are known to a person familiar with vibrating micro-mechanical sensors, and not described here in detail for simplicity. Following examples will show a couple of exemplary embodiments.

The rotor mass (103) is typically supported to the body of the sensor element to a suspending structure (106) essentially in the middle of the rotor mass (103), sometimes called as an anchor, using flexible springs (118, not shown for clarity in FIG. 1a) between the suspending structure (106) and the rotor mass (103) that allow the rotor mass (103) to rotate about the centre of the rotor mass (103) structure. In this arrangement, the primary rotation of the rotor mass (103) occurs in the plane of the rotor mass (103), in the xy-plane, about the z-axis traversing through the geometrical centre of the sensor element and the rotor mass (103). The plane of the rotor mass (103), or the plane of the sensor element means the plane formed by the sensor elements when in rest, i.e. when not excited to any movement.

The sensor element may be excited through excitation combs arranged in the ends of the linearly moving masses (not shown), but any other method and structure for exciting the device may be used as known by a person skilled in the art. For example, piezoelectric excitation may alternatively be used. The primary oscillation movement and the primary mode are further explained in relation to FIGS. 2a to 2d.

For exciting the rotor mass (103) into the desired rotating primary motion, the device has a beam and spring arrangement that will be explained next. The two linearly moving masses (101, 102) are coupled to each other by first levers (110, 112), which are stiff, i.e. not allowing any significant bending or twisting. These first levers (110, 112) are coupled to the two linearly moving masses (101, 102) with flexible springs (120, 121, 122, 123). If the linearly moving masses (101, 102) would be made of just one piece, the flexible springs would be coupled to the mass itself. In case the linearly moving masses (101, 102) would have inner and outer masses, the flexible springs would naturally be coupled to the outer mass, i.e. the frame. Each first lever structure is further enhanced into a lever T-shaped lever structure by adding further second levers (114, 116) each coupling one of the two first levers (110, 112) to the rotor mass (103) through a flexible spring (115, 117) respectively. First lever (110) and second lever (114) form together a T-shape lever essentially similar to the one formed by first lever (112) and second lever (116), the T-shape levers being located on opposite sides of the rotor mass (103). These different beam structures forming the T-shape levers are preferably manufactured during same manufacturing steps, i.e. there is no particular "coupling", "attaching" or "connecting" required for the beams, but they may be formed through a patterning process such as masking and etching process on a single silicon wafer, where all sensor structures may be created using at least some common manufacturing process steps.

The two T-shaped lever structures are preferably located in symmetrical positions when the device is in rest, so that the second levers (114, 116) are coupled to the rotor mass (103) between them, and the T-shape levers are placed opposite to each other on two opposite sides of the rotor mass (103), and the rotor system, comprising the rotor mass (103) and springs coupling it to the suspension structure (106), is symmetrical in relation to at least one axis traversing through the center of the rotor mass (103). In this example, the system is symmetrical both in relation to x-axis and in relation to y-axis. In the current example, the rotor mass (103) is quadrangle, and the T-shape levers are on different opposite sides than the linearly moving masses (101, 102) so that either a linearly moving mass (101, 102) or a T-shape lever appears on each side of the rotor mass (103). There may be a suspension structure (106) in an enclosure essentially in the middle of the rotor mass (103), suspending the rotor to the device body. The device body is not shown in this figure, but may be understood to exist i.e. under or on top of the presented sensor element. The rotor mass (103) may be suspended with the suspension structure (106) in the plane of the rotor mass (103) with springs (118) allowing the rotor mass (103) to rotate in at least one direction, i.e. about at least one axis. In the current example, the spring structure (118) coupling the rotor mass (103) to the suspension structure (106) may allow the rotor mass (103) to rotate about all three axes (x, y, z). In addition to the suspension structure (106) within an enclosure essentially in the middle of the rotor mass (103), there may be a number of further suspension structures (107) for the purpose of suspending the sensor element in the intended plain of masses above a handle wafer when in rest and/or when excited into the primary mode occurring in the plain of masses. Spring arrangements allow the rotor mass (103) and the linearly moving masses (101, 102) to move in relation to the suspension structures (106, 107). The sensor element may comprise further structural parts, such as driving and detection combs and/or springs or other driving elements, additional suspension structures etc. Not all of these structures and element are shown in the schematic presentation of FIGS. 1a and 1b, but only the parts necessary to understand the claimed invention.

While we describe the construction of a first lever (110 or 112) and a second lever (114 or 116 respectively) as a T-shaped lever, it should be understood that the structure may have some variations without departing from the invention. Variations may be caused by some non-idealities in manufacturing process, or they may be intentional. The second lever (114, 116) is preferably attached to the respective first lever (110, 112) in angle of 90 degrees, but the angle may vary slightly without significantly changing the functionality of the T-shaped lever. Similarly, the position of the second lever (114, 116) may not be in the absolutely middle of the respective first lever (110, 112), but may be slightly aside. The vertex between the levers or any corner in a bend of a beam/spring may not be sharp, but there may be some rounding i.e. fillets in the vertices. In manufacturing process, some sharp corners may become slightly smoothed out by fillets even without any design measures. On the other hand, fillets may even be designed in the vertices in purpose of relieving stress in the vertex area. There may be some intentionally added material in the vertex area i.e. for stress relief or for increasing stiffness of the T-shaped lever. Even further, the stiff levers may comprise beams that are not uniform in cross-section. The first levers and/or the second levers forming the T-shape may even be curved or comprise curved or bent sections. Any variation of the T-shaped lever is within the scope, as long as the three ends of the T-shape lever coupled to the seismic masses (101, 102, 103) form an isosceles triangle, so that the distances between each end of the first lever (110 or 112) and the end of the second lever (114 or 116 respectively) are essentially equal.

Figure 2A:
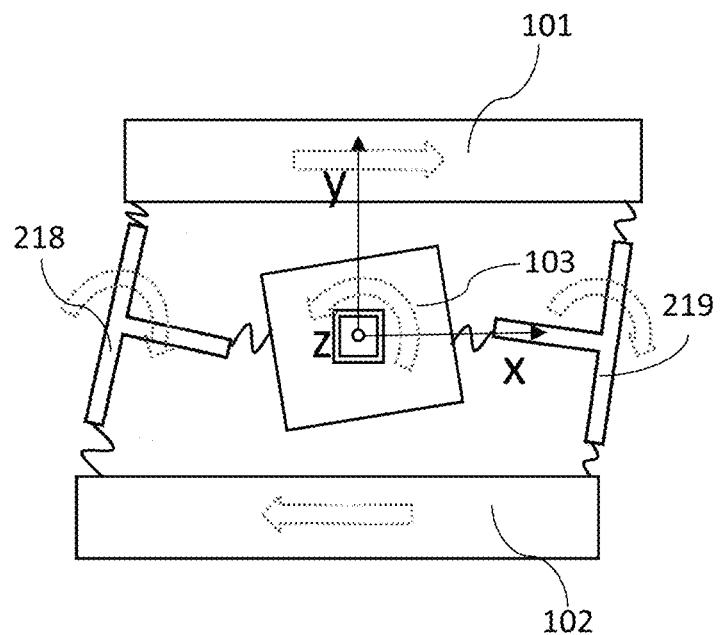
FIG. 2a presents schematically a first primary mode of oscillation.
Figure 2B:
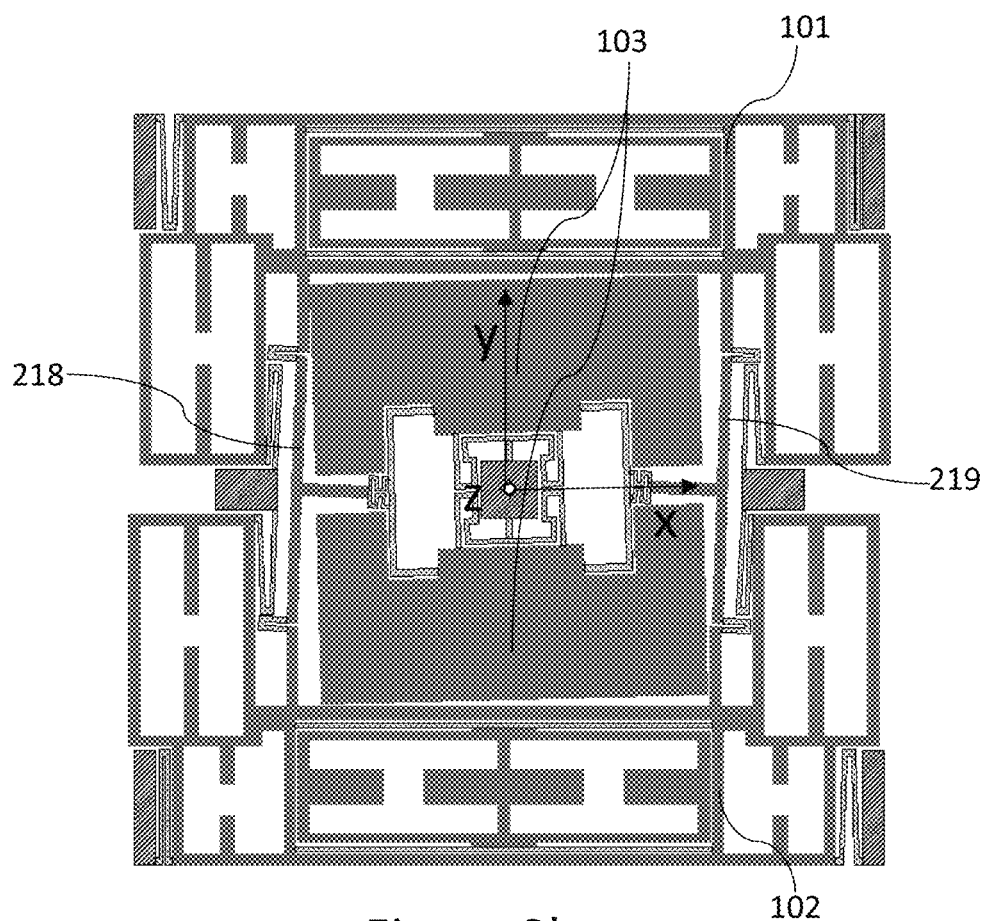
FIG. 2b presents a MEMS embodiment of the first primary mode of oscillation.
Figure 2C:
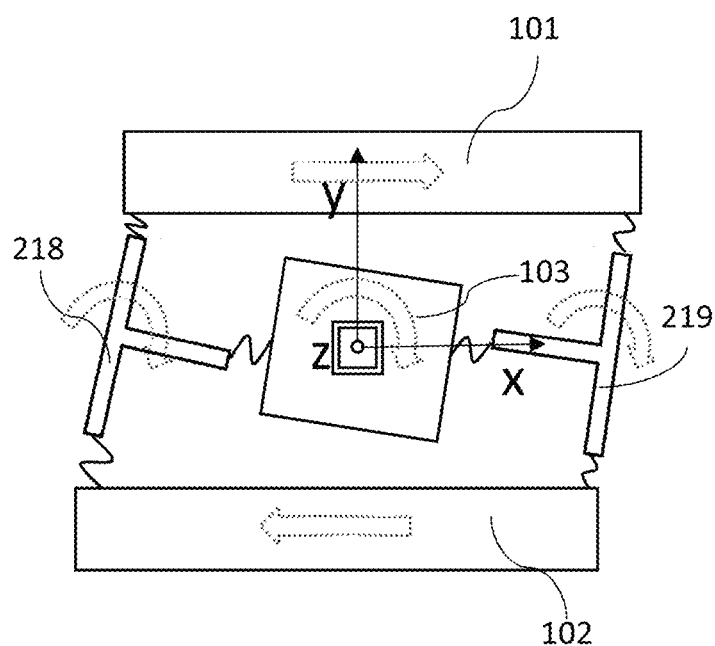
FIG. 2c presents schematically a second primary mode of oscillation.
Figure 2D:
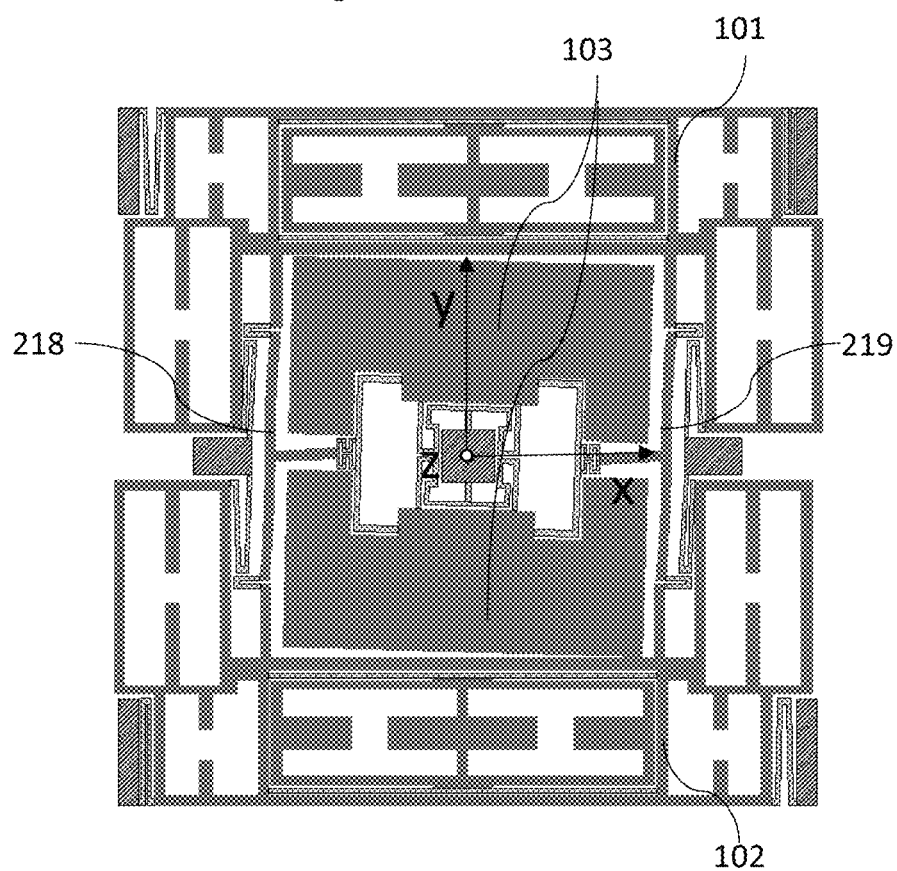
FIG. 2d presents a MEMS embodiment of the second primary mode of oscillation.

FIGS. 2a, 2b, 2c and 2d describe two examples of several possible motion modes enabled by the T-shaped lever structures (218, 219) corresponding to the combinations of the stiff linear beam (110, 112) and the second lever (114, 116 respectively) in FIGS. 1a and 1b. FIGS. 2a and 2b are presentations of a first primary mode, FIG. 2a being a more generic schematic view, and FIG. 2b presenting an embodiment of the first primary mode with more structural details as implemented in a MEMS device. FIGS. 2c and 2d present a second primary mode, different from first primary mode, FIG. 2c being a generic schematic view and FIG. 2d presenting an exemplary embodiment of the second primary mode with more structural details as implemented in a MEMS device. The T-shaped levers (218, 219) coupling the linearly moving masses (101, 102) and the rotor mass (103) enable at least two modes of movement that differ significantly from each other not only by relative directions of movement of different structural parts, but also by nominal frequencies of the different modes of movement.

The system is preferably excited by causing the two linearly moving masses (101, 102) to move in linear primary oscillation motion, oscillating in the direction of the x-axis, within the plane of the device. Each linearly moving mass (101, 102) move along a different axis, parallel to the x-axis at a non-zero distance from the x-axis and from each other. When the structure is not excited by external forces, it remains in a position that we may call the equilibrium state. The linearly moving masses (101, 102) may be excited into an oscillation with a given frequency where the linearly moving masses (101, 102) first move away from the equilibrium state until they reach a set displacement from the equilibrium state, and then move back towards the equilibrium state, and further continue the movement to the opposite direction to a set displacement, and again the direction of the movement changes to return to the equilibrium state. In example, in FIGS. 2a, 2b, 2c and 2d, the upper linearly moving mass (101) has moved to the right, and the lower linearly moving mass (102) has moved to the left. Thus, the two linearly moving masses (101, 102) move in opposite direction along their respective axes located in parallel, with non-zero distance from each other. We can also say that the phases of the linear primary oscillation motion of the two linearly moving masses are opposite. The direction of the movement which has brought the linearly moving masses (101, 102) in their current position is indicated in the schematic presentation with dotted line arrows. In all FIGS. 2a, 2b, 2c and 2d we can also notice that to reach the current position of the linearly moving masses (101, 102) after first being in the equilibrium state, the linearly moving masses (101, 102) have moved to a direction that has an angular momentum in clockwise direction about an axis of rotation (z-axis) located in the geometrical center of the rotor mass (103) and the entire sensor structure. In the next cycle of the oscillation, the linearly moving masses (101, 102) have a total angular momentum in counter clockwise direction, reaching a position that can be described as being mirror image of FIGS. 2a to 2d, when mirrored with respect to the y-axis. The cycle continues back towards the position as shown in FIGS. 2a, 2b, 2c and 2d, where the linearly moving masses (101, 102) have an angular momentum in clockwise direction about the axis of rotation (z-axis). During the linear primary oscillation motion, the movement of the linearly moving masses (101, 102) may even have some other movement components such as unwanted quadrature movement in addition to the intended linear primary oscillation motion. Quadrature movement may be reduced by any method known to a person familiar in the art. In view of the current invention aiming to an improved primary mode, the main interest with respect to the linearly moving masses (101, 102) is the linear primary oscillation motion and the angular momentum caused by the above described linear motion in the primary mode, where the two linearly moving masses (101, 102) oscillate in opposite phases and cause a net (sum) angular momentum with reference to the common axis of rotation (z-axis) in the geometrical center of the rotor mass (103), which is also the geometrical center of the entire sensor structure.

The linear primary oscillation motion of the linearly moving masses (101, 102) causes the rotor mass (103) to rotate about the centre of the rotor mass (103). This motion is called the rotating primary motion of the rotor mass (103). The linear oscillation motion is conveyed by the T-shape levers (218, 219) towards the rotor mass (103), causing the rotor mass (103) to start its own characteristic primary movement. The flexible springs and the T-shaped lever structures (218, 219) combining the two linearly moving masses (101, 102) and the rotor mass (103) together cause forces effecting the rotor mass (103), and it starts an oscillating rotation motion with a frequency set by the linear primary oscillation motion of the linearly moving masses (101, 102).

The stiff T-shaped levers (218, 219), when coupled to the three moving masses with flexible springs, such as straight beams, folded beams, U-shaped or serpentine springs, enable the rotor mass (103) rotational freedom in desired directions. This rotational freedom provides the sensor element with capability to several different modes of primary oscillation, out of which two exemplary modes of oscillation will be explained next in more detail.

FIGS. 2a and 2b present a first primary mode, in which the linearly moving masses (101, 102) and the rotor mass (103) move in a manner that we call anti-phase primary mode. In this mode, the rotor mass (103) rotates in a phase that is opposite to the phase of the linearly moving masses (101, 102). When the linearly moving masses (101, 102) reach the position where they're reached the peak position after moving in a direction that causes the linearly moving masses (101, 102) to have angular momentum in clockwise direction, the rotor mass (103) reaches its peak position after rotating into counter clockwise direction. During the movement towards this peak position, the rotor mass (103) has an angular momentum about the axis of rotation (z-axis) located in the center of the rotor mass (103), which is in the opposite direction from the angular momentum caused by the movement of the linearly moving masses (101, 102). The directions of the movements and the momenta in different elements are shown by the dotted line arrows. Similar situation and relative direction of momenta continues when the oscillation turns to next phase of rotation. The linearly moving masses (101, 102) have a combined angular momentum with respect to the rotation axis (z-axis) located in the origin, i.e. in the geometrical center of the rotor mass (103) that is in counter clockwise direction, whereas the rotor mass (103) has an angular momentum in clockwise direction with respect to the same rotation axis (z-axis). Based on the design and the inertia of the three masses, T-shape levers, springs and the whole structure of the system, there is a certain frequency when it reaches such steady anti-phase oscillation motion. The frequency can be called as the nominal frequency of anti-phase drive mode. When the linearly moving masses (101, 102) and rotor mass (103) have been designed properly, the sum of angular momentum of the linearly moving masses (101, 102) is opposite and nearly equal in strength as the angular momentum of the rotor mass (103), so that the angular momenta cancel each other to high extent, and the remaining total angular momentum of the oscillating system is very low as compared to almost any other mode of rotation that is possible for this kind of system. We can also notice that even the T-shaped levers (218, 219) rotate in opposite direction to the rotation of the rotor mass (103). While the T-shaped levers (218, 219) are not fixed to any centre of rotation, they may have some angular momentum in relation to the rotation axis of the rotor mass (103). Even the angular momentum caused by the T-shaped levers (218, 219), which in practice have some mass themselves, may be taken into account when designing a system with minimum total angular momentum, but this is omitted here for simplicity.

The ratio of the remaining total angular momentum of the moving masses in the system may be described as:

$$\frac{|L_{linear1} + L_{linear2}| - |L_{center}|}{|L_{linear1} + L_{linear2}| + |L_{center}|} = L_{remaining} \quad [1]$$

Where $L_{Rlinear1}$ and $L_{linear2}$ stand for the angular momentum of the linearly moving masses (101, 102) respectively, and $L_{center}$ stands for the angular momentum of the rotor mass (103). The angular momentum $L_{Rlinear1}$, $L_{linear2}$ of the linearly moving masses (101, 102) is understood to comprise the component of the total momentum of the linearly moving masses (101, 102) that has the direction of a tangent for a radius drawn from the centre of the rotor mass (103) at any moment. While the linearly moving masses (101, 102) movement is not rotational, the radius between the centre of the rotor mass (103) and the centre of gravity of each of the linearly moving masses (101, 102) changes slightly over time when the linearly moving masses (101, 102) are in the linear primary oscillation motion. The anti-phase primary mode of FIG. 2a occurs when the frequency of the oscillation of the linearly moving masses (101, 102) is preferably lower than the frequency of the oscillation in the second primary mode which will be described below. A distinctive difference in these two nominal oscillation frequencies facilitates robustness of the device. With suitable dimensioning the rotor mass (103) and the linearly moving masses (101, 102) (and optionally also the T-shape levers (218, 219)), the remaining total momentum of the system $L_{remaining}$ in this first primary mode may be 5% or less than the sum of the absolute values of the angular momenta of these masses. For example, the total angular momentum value of 4% of the sum of the absolute values of the angular momenta has been achieved in simulations.

FIGS. 2c and 2d describes a second primary mode that may be called parallel phase primary mode or a parasitic mode. When the excitation frequency of the linearly moving masses (101, 102) is set properly, the system of the masses have another oscillation equilibrium state, where the rotor mass (103) always has an angular momentum that is in the same direction with the angular momentum caused by the linearly moving masses (101, 102). Again, the direction of the movement in each part is marked with the dotted arrows. As all major inertial masses of the device have angular momentum in same direction, so that the momenta will be summed up, this mode causes rather high total angular momentum for the system. The total angular momentum in this mode corresponds to the denominator of the equation [1]. In other words, the total angular momentum of the parallel phase primary mode has a total momentum which corresponds to the sum of the absolute values of the momenta of the linearly moving masses (101, 102) and the rotor mass (103). Further, even the angular momenta of the T-shaped levers (218, 219) have same direction and adds to the total sum of angular momentum. Even this additional angular momentum caused by the T-shaped levers (218, 219) may be taken into account in the design, but is omitted here for simplicity.

The parallel phase primary mode of oscillation has a clearly higher nominal frequency than the anti-phase primary mode of oscillation. While the two oscillations are clearly distinct with frequency, the sensor structure can be excited to the wanted anti-phase primary mode oscillation with high reliability. In an exemplary system, the anti-phase primary mode has a nominal frequency of about 8 kHz, whereas the parallel phase primary mode has over double nominal frequency of about 18 kHz. Enabling use of a low nominal frequency for the preferred primary mode provides benefits for the sensor element. When the anti-phase primary mode (first primary mode) is set as the lowest nominal frequency mode, mechanical robustness of the sensor element is facilitated.

A sensor element as described here, having multiple moving seismic parts may have one or more further primary modes. While the first primary mode we have described (the anti-phase primary mode) may be the preferred primary mode, we may call all other primary modes as parasitic modes. FIGS. 2c and 2d describe one exemplary parasitic mode, which we call as the second primary mode. A clear nominal frequency separation between the preferred operation mode (the first, anti-phase primary mode) and any parasitic operation mode (i.e. the second, parallel primary mode) also improves stability of the preferred primary mode. Thus, it's beneficial if the design of the sensor element facilitates the parasitic modes with having nominal frequencies which are as far from the preferred primary mode as possible. When the first primary mode has a low nominal frequency, this suggests that the parasitic operation modes should preferably have clearly higher nominal frequencies than the first primary mode.

Figure 3:
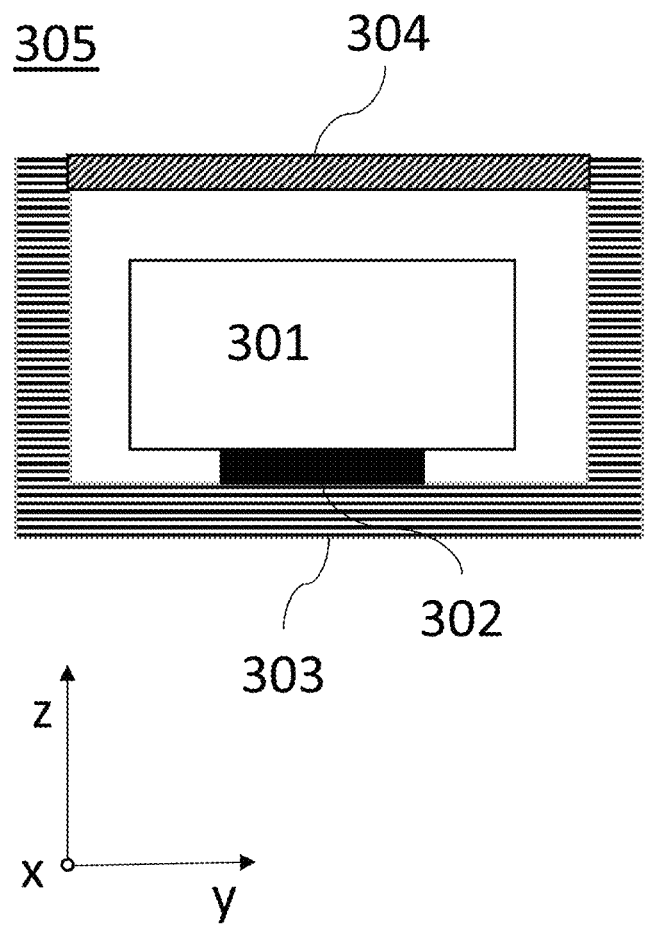
FIG. 3 presents schematically a sensor device.

FIG. 3 presents schematically a sensor device (305), where the sensor element (301), comprising inertial elements like the ones described in FIGS. 1a, 1b, 2a, 2b, 2c, 2d, 4a and 4b and the device body supporting the inertial elements, is placed inside a housing (303), which may be comprise a pre-molded or overmolded package made of plastic material, a ceramic package or a chip size package. The sensor element (301) is placed inside a housing (303), and attached to the housing with adhesive (302). The housing is covered with a cap (304), which may be i.e. made out of metal such as nickel iron alloy, or our of plastic material.

Having a low total momentum for the system provides significant benefits. When the total momentum of the sensor element (301) is near to zero, the sensor device (305) does not cause any vibration towards its environment, and the vibration occurring inside the sensor device (305) cannot be detected from outside. There is very little or no vibrational energy leaking to the outside of the sensor element (301), which leaking could cause problems in example for instance stability of sensor device (305) Q-value. Even if a hard adhesive such as epoxy was used for attaching the sensor element (301) to its housing (303), low or zero total momentum would decrease or eliminate the influence of leaking of the vibrational energy out of the sensor device (305). However, use of hard adhesive may further cause increase in mechanical interference towards the sensor element (301). In example, interference from another resonator located nearby the sensor device (305), such as similar kind of sensor or other part with resonance frequency close to the one of the sensor element (301), may be increased if hard adhesive was used. Thus, it has been found that capability to use soft adhesive is beneficial.

When the oscillating sensor element (301) does not itself cause any significant vibration towards the housing (303), use of a soft adhesive (302) is enabled for mounting the vibrating sensor element (301) to the housing (303). In case there was a total non-zero momentum from the sensor element (301) and it was attached to the housing (303) using soft adhesive (302), the sensor element (301) might move inside the housing (303), which is not acceptable. A zero or very low momentum sensor element (301) allows use of soft adhesive (302) for attaching the sensor element (301) into the housing (303). Use of soft adhesive (302), such as silicon, is beneficial and worth pursuing, since it reduces the external stress through the adhesive (302) from or through the housing and package, i.e. due to temperature changes. Thus, use of soft adhesive (302) enables better bias stability and sensing stability over changing temperatures. Low total momentum also improves total stability of driving oscillation (primary mode), which is especially important during the starting up of the sensor element (301), or when external shocks occur towards the sensor device (305).

Figure 4A:
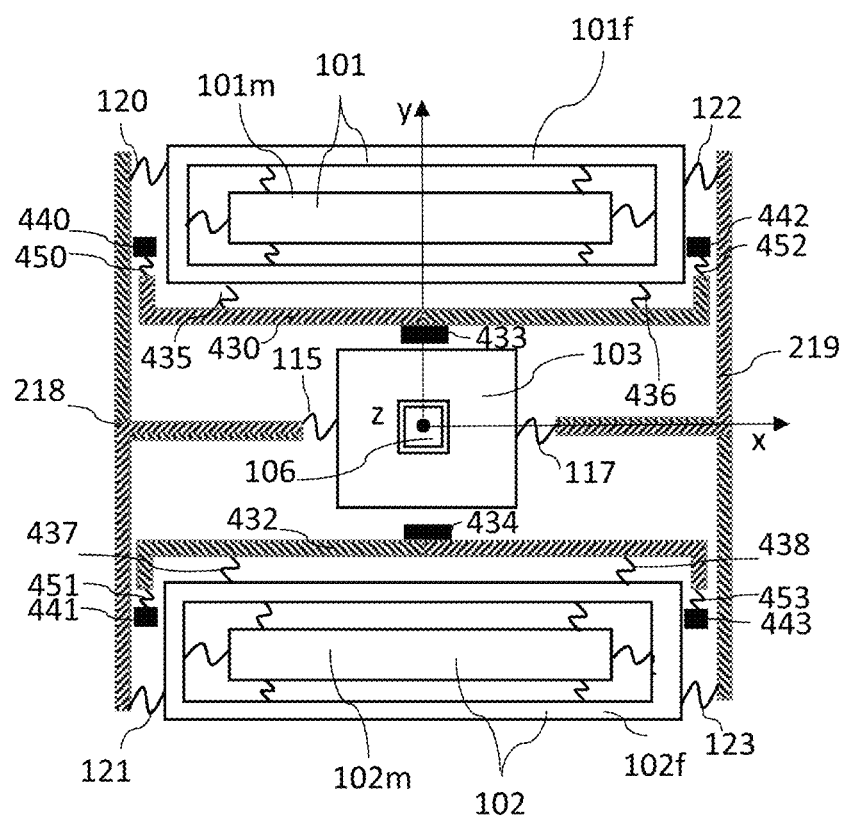
FIGS. 4a and 4b present an alternative embodiment of a sensor element.
Figure 4B:
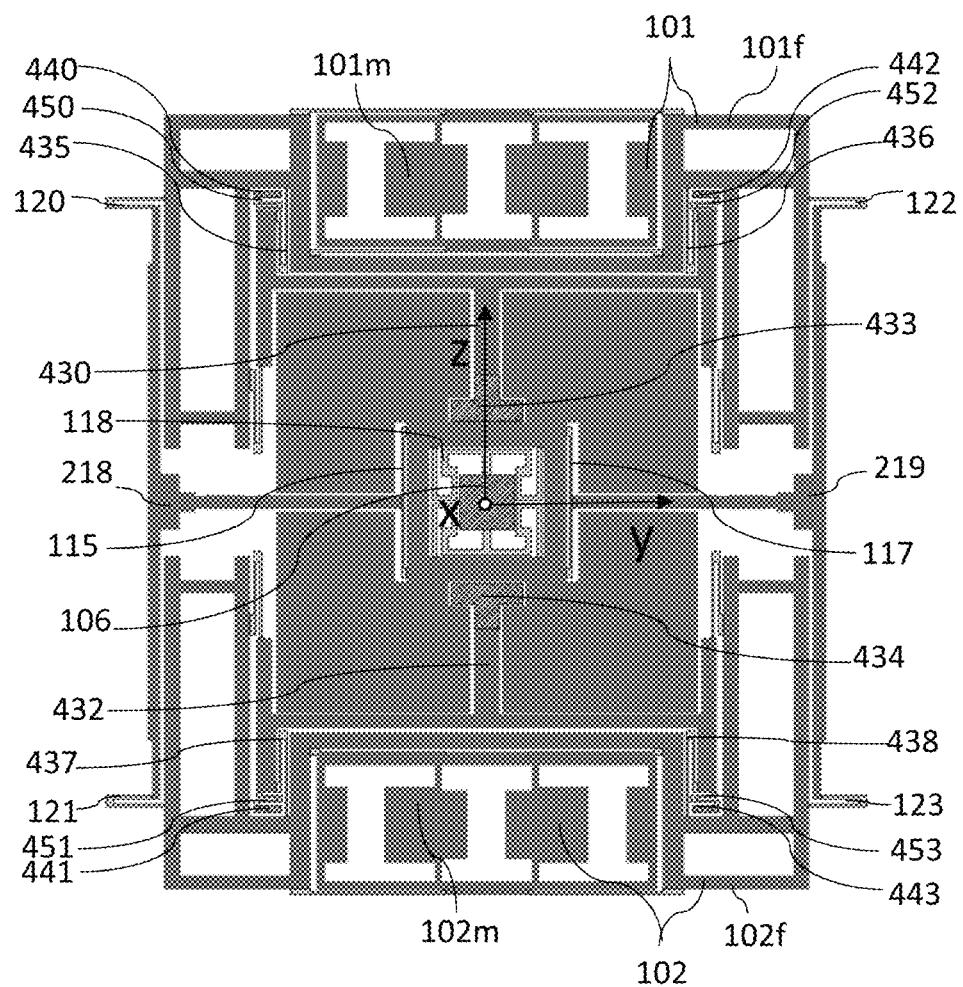

FIGS. 4a and 4b present another, alternative embodiment of the same principles for a sensor element. Again, these figures describe the main inertial parts of the sensor element, and the supporting body is not shown. FIG. 4a is a schematic figure of the sensor element, whereas FIG. 4b describes an embodiment of a physical device. As in FIG. 1, there is a rotor mass (103) set between two linearly moving masses (101, 102). T-shaped levers (218, 219) couple the linearly moving masses (101, 102) with each other through flexible springs (120, 121, 122, 123). Here, each linearly moving mass (101, 102) comprises inner mass (101m, 102m) and outer mass (101f, 102f), the latter may also be called as frames. Each inner mass (101m, 102m) is coupled with the respective outer mass (101f, 102f) with at least two springs, which are rather stiff in the direction of the linear primary oscillation motion, thus causing the inner mass (101m, 102m) to follow the motion of the outer mass (101f, 102f) when excited to the linear primary oscillation motion. The T-shaped levers (218, 219) are now coupled to the frame parts (101f, 102f) of the linearly moving masses (101, 102) with flexible springs (120, 121, 122, 123) and to the rotor mass (103) through flexible springs (115, 117). Similarly to the exemplary device described in FIG. 1, the T-shaped lever (218, 219) may be described to comprise a first lever between the linearly moving masses (101, 102) and a second lever coupling the first lever to the rotor mass (103), and the three ends of each T-shape lever (218, 219) form an isosceles triangle. The rotor mass (103) is coupled to a suspension structure (106) located, within an enclosure, essentially in the middle of the rotor mass (103) with a flexible spring arrangement (118 in FIG. 4b, not shown in FIG. 4a for clarity) that is symmetrical both in x- and y-direction in respect to the two axes crossing the centre of the device in the plane of the rotor mass (103).

FIG. 4b shows an example of possible structural variation in the area where the second lever and first lever join with each other to form the T-shaped levers (218, 219), with some added material in the vertices for increasing the stiffness of the structure, i.e. preventing the T-shaped lever from bending at or near the coupling area of the first levers and the second levers.

The embodiment presented in FIGS. 4a and 4b also comprises additional supporting frame structures (430, 432), providing further support to the linearly moving masses (410, 412). These supporting frame structures (430, 432) are directly coupled to a number of suspension structures (433, 434), which may also be called as main anchors. Preferably the supporting frame (430, 432) is fixed with the respective main anchor (433, 434). The supporting frame structure (430) is coupled to the respective linearly moving mass (101) with at least two springs (435, 436). The supporting frame structure (432) is coupled to the respective linearly moving mass (102) with at least two springs (437, 438). A purpose of the supporting frame structures (430, 432) is to improve stability of the linearly moving masses (101, 102) especially in direction of z-axis.

FIGS. 4a and 4b present yet a further support arrangement with additional suspension structures called sub anchors (440, 441, 442, 443) arranged to further suspend the supporting frame structures (430, 432) in the intended plane of the device when in rest and/or in primary mode. Springs (450, 452) couple the supporting frame structure (430) with two sub anchors (440, 442) respectively. Springs (451, 453) couple the supporting frame structure (432) with two sub anchors (441, 443) respectively. By improving the suspension of the supporting frame structure (430, 432) with the sub anchors (440, 441, 442, 443), the stability of the primary mode of the linearly moving masses (101, 102) is further enhanced and unwanted movement components of the linearly moving masses (101, 102) are reduced, especially in z-axis direction.

The embodiment presented in FIGS. 4a and 4b produces more stable rate offset over temperature variations even under deformation due to external stress or thermal stress, than the more conventional type device presented in FIG. 1. The possible quadrature signal (unintended movement of the masses in direction of z-axis, when only primary movement is present) is reduced by the additional supporting frame arrangement, and the quadrature signal has also less variation due to temperature changes. Thus, the embodiment described in FIGS. 4a and 4b may be a preferred embodiment when the sensor device is used in harsh conditions.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A structure for a vibrating sensor of angular velocity, said structure comprising:
   at least one rotor mass and two linearly moving masses;
   two T-shaped levers, each coupled to the two linearly moving masses and to the rotor mass by flexible springs; wherein
   the two linearly moving masses are configured to be excited with excitation combs or piezoelectric excitation into a linear anti-phase primary oscillation motion, wherein the linear anti-phase primary oscillation motion is caused by said exciting and occurs along two different axes that are mutually parallel and at a non-zero distance from each other in the plane of the structure, whereby the two linearly moving masses are further configured to oscillate in a Coriolis force driven secondary oscillation motion orthogonal to the linear anti-phase oscillation motion when the two linearly moving masses are subject to Coriolis force;
   the T-shaped levers are configured to convey the linear anti-phase primary oscillation motion of the two linearly moving masses to the rotor mass and thereby excite a primary rotation motion of the rotor mass in the plane of the structure, whereby the rotor mass is further configured to oscillate in a Coriolis force driven secondary rotation motion orthogonal to the primary rotation motion when the rotor mass is subject to Coriolis force;
   a direction of angular momentum of the rotor mass in the primary rotation motion with respect to a geometrical center of the structure is opposite to a direction of angular momenta of the linearly moving masses in the linear anti-phase primary oscillation.

2. The structure for a vibrating sensor of angular velocity of claim 1, wherein the two T-shaped levers are located symmetrically at first opposite sides of the rotor mass.

3. The structure for a vibrating sensor of angular velocity of claim 2, wherein said linearly moving masses are located symmetrically at second opposite sides of the rotor mass.

4. The structure for a vibrating sensor of angular velocity of claim 1, wherein primary motion comprises at least one of:
   the linear primary oscillation motion is configured to occur along two parallel first axes respectively, wherein the two linearly moving masses are configured to move in opposite phases, and wherein the two parallel first axes are separated by a non-zero distance; and
   the rotating primary motion of the rotor mass is configured to occur about a second axis perpendicular to the plane of the structure.

5. The structure for a vibrating sensor of angular velocity of claim 1, wherein
   each T-shape lever comprises a second lever attached to a first lever in the middle of the length of the first lever;
   the second lever and the first lever are attached at an angle of 90 degrees;
   ends of the first lever of the first T-shape lever are equidistant from the end of the second lever of the first T-shape lever that is furthest from the first lever of the first T-shape lever; and
   ends of the first lever of the second T-shape lever are equidistant from the end of the second lever of the second T-shape lever that is furthest from the first lever of the second T-shape lever.

6. The structure for a vibrating sensor of angular velocity of claim 1, wherein the anti-phase primary mode has a total angular momentum that is less than 5% of a sum of absolute values of angular momenta of the rotor mass and the two linearly moving masses.

7. The structure for a vibrating sensor of angular velocity of claim 1, further comprising:
   two supporting frames, each of the two supporting frames being coupled non-flexibly to a first suspending structure and each of the two supporting frames coupled to at least two second suspending structures with flexible springs, wherein each of the two supporting frames are coupled to one of the linearly moving masses with at least two flexible springs.

* * * * *